United States Patent [19]
Maris

[11] Patent Number: 5,864,393
[45] Date of Patent: Jan. 26, 1999

[54] OPTICAL METHOD FOR THE DETERMINATION OF STRESS IN THIN FILMS

[75] Inventor: Humphrey J. Maris, Barrington, R.I.

[73] Assignee: Brown University Research Foundation, Providence, R.I.

[21] Appl. No.: 902,695

[22] Filed: Jul. 30, 1997

[51] Int. Cl.[6] .............................. G01P 3/36; G01B 11/16; G01L 1/24

[52] U.S. Cl. ................................ 356/28; 73/762; 73/800; 356/32

[58] Field of Search ...................... 73/800, 762; 356/32, 356/28

[56] References Cited

U.S. PATENT DOCUMENTS

| | | | |
|---|---|---|---|
| 4,484,820 | 11/1984 | Rosencwaig | 374/6 |
| 4,522,510 | 6/1985 | Rosencwaig et al. | 374/7 |
| 4,579,463 | 4/1986 | Rosencwaig et al. | 374/57 |
| 4,632,561 | 12/1986 | Rosencwaig et al. | 356/432 |
| 4,636,088 | 1/1987 | Rosencwaig et al. | 374/5 |
| 4,679,946 | 7/1987 | Rosencwaig et al. | 374/5 |
| 4,710,030 | 12/1987 | Tauc et al. | 356/432 |
| 4,750,822 | 6/1988 | Rosencwaig et al. | 356/445 |
| 4,795,260 | 1/1989 | Schuur et al. | 356/400 |
| 4,854,710 | 8/1989 | Opsal et al. | 356/432 |
| 4,952,063 | 8/1990 | Opsal et al. | 356/432 |
| 4,999,014 | 3/1991 | Gold et al. | 356/382 |
| 5,042,951 | 8/1991 | Gold et al. | 356/369 |
| 5,042,952 | 8/1991 | Opsal et al. | 356/432 |
| 5,074,669 | 12/1991 | Opsal | 356/445 |
| 5,270,781 | 12/1993 | Singh et al. | 356/32 |
| 5,546,811 | 8/1996 | Rogers et al. | 73/800 |

OTHER PUBLICATIONS

W. Lee Smith et al. "Ion implant monitoring with thermal wave technology". Appl. Phys.Lett.4. vol. 47.No.6, Sep. 15, 1985. pp. 584–586.

J. Opsal et al. "Thermal and plasma wave depth profiling in silicon". Appl. Phys. Lett. vol. 47 No. 5, Sep. 1, 1985. pp. 498–500.

A. Rosencwaig et al. "Thin–film thickness measurements with thermal waves". Appl. Phys. Lett., vol. 43 No. 2, Jul. 15, 1983. pp. 166–168.

A. Rosencwaig et al. "Detection of thermal waves through optical reflectance". Appl. Phys. Lett., vol. 46 No. 11, Jun. 1, 1985. pp. 1013–1015.

A. Elci et al. "Physics of Ultrafast Phenomena in Solid State Plasmas". Solid–State Electronics, vol. 21, 1978, pp. 151–158.

(List continued on next page.)

*Primary Examiner*—Mark Hellner
*Attorney, Agent, or Firm*—Perman & Green, LLP

[57] ABSTRACT

A method and optical system is disclosed for measuring an amount of stress in a film layer disposed over a substrate. The method includes steps of: (A) applying a sequence of optical pump pulses to the film layer, individual ones of said optical pump pulses inducing a propagating strain pulse in the film layer, and for each of the optical pump pulses, applying at least one optical probe pulse, the optical probe pulses being applied with different time delays after the application of the corresponding optical probe pulses; (B) detecting variations in an intensity of a reflection of portions of the optical probe pulses, the variations being due at least in part to the propagation of the strain pulse in the film layer; (C) determining, from the detected intensity variations, a sound velocity in the film layer; and (D) calculating, using the determined sound velocity, the amount of stress in the film layer. In one embodiment of this invention the step of detecting measures a period of an oscillation in the intensity of the reflection of portions of the optical probe pulses, while in another embodiment the step of detecting measures a change in intensity of the reflection of portions of the optical probe pulses and determines a time at which the propagating strain pulse reflects from a boundary of the film layer.

29 Claims, 11 Drawing Sheets

OTHER PUBLICATIONS

D.H. Auston et al. "Picosecond Spectroscopy of Semiconductors". Solid–State Electronics, vol. 21, 1978, pp. 147–150.

D. H. Auston et al. "Picosecond Ellipsometry of Transient Electron–Hole Plasmas in Germanium". Physical Review Letters, vol. 32, No. 20. May 20, 1974 pp. 1120–1123.

R.J. Stoner et al. "Kapitza conductance and heat flow between solids at temperatures from 50 to 300K". Physical Review B, vol. 48, No. 22, Dec. 1, 1993 pp. 16 373–16 387.

R.J. Stoner et al. "Measurements of the Kapitza Conductance between Diamond and Several Metals". Physical Review Letters, vol. 68 No. 10, Mar. 9, 1992 pp. 1563–1566.

S. Sumie et al. "A New Method of Photothermal Displacement Measurement by Laser Interferometric Probe". Jpn. J. Appl. Phys. vol. 31 Pt. 1, No. 11, 1992 pp. 3575–3583.

S. Sumie et al. J.Appl. Phys. 76(10), Nov. 15, 1994 pp. 5681–5689.

F.E. Doany et al. "Carrier lifetime versus ion–implantation dose in silicon on sapphire". Appl. Phys. Lett. 50(8), Feb. 23, 1987 pp. 460–462.

D.A. Young et al. "Heat Flow in Glasses on a Picosecond Timescale". Dept. of Engineering, Brown University, Providence, RI. 1986. pp. 49–51.

"Third order nonlinear optical interactions in thin films of poly–p–phenylenebenzobisthiazole polymer investigated by picosecond and subpicosecond degenerate four wave mixing" by D. Narayana Rao, Jacek Swiatkiewicz, Pratibha Chopra, Suniti K. Ghoshal and Paras N. Prasad, Appl. Phys. Lett. vol. 48, No. 18, 5 May 1986.

"Picosecond transient grating studies of polymeric thin films" By D. Narayana Rao, Ryszard Burzynski, Xin Mi, and Paras N. Prasad, Appl. Phys. Lett., vol. 48, No. 6, 10 Feb. 1986.

OPTICAL METHOD FOR THE DETERMINATION OF STRESS IN THIN FILMS

STATEMENT OF GOVERNMENT RIGHTS

This invention was made with government support under grant number DE-FG02-86ER45267 awarded by the Department of Energy. The government has certain rights in this invention.

FIELD OF THE INVENTION

This invention relates generally to a method and apparatus for characterizing a sample using electromagnetic radiation and, in particular, relates to a system for determining an amount of stress in a thin film layer.

BACKGROUND OF THE INVENTION

There is currently a great interest in the semiconductor industry in the determination of the mechanical stress in thin films. Films that are in a state of high stress can fracture, delaminate from a substrate or film onto which they are deposited, or can cause another film or the substrate to fracture. Any of these occurrences can result in the failure of an integrated circuit chip that includes the film. It is therefore desirable to have a technique for determining an amount of stress in a thin film, preferably by a non-contact and non-destructive method.

The stress that is present in a material is specified through a stress tensor $\sigma$. The elements of this tensor are the coefficients $\sigma_{\alpha\beta}$, where the indices $\alpha$ and $\beta$ run from 1 to 3. Thus, for example, $\sigma_{11}$ indicates the force per unit area acting in the x-direction on a surface of the material whose plane is normal to the x-direction. At a free surface of a material, i.e., a surface which is not subjected to any external forces, the normal component of the stress must vanish. A uniform planar film deposited onto a substrate whose surface lies in the xy-plane will have a surface normal to the z-direction. Thus, the component $\sigma_{33}$ of the stress tensor must vanish at the top surface of the film. For a film in a state of stress the components $\sigma_{11}$ and $\sigma_{22}$ of the stress tensor may be non-zero. In many situations of interest these two components are equal. In such circumstances it is customary to specify the stress by the in-plane pressure P defined as $$P = -\sigma_{11} = -\sigma_{22} \qquad (1)$$

In one known method for stress measurement a blanket film is deposited onto a substrate (see, for example, A. K. Sinha, H. J. Levinstein, T. E. Smith, J. Appl. Phys. 4, 2423 (1978)). The stress in the film is then determined from a change in the curvature of the wafer that is produced following the deposition of the film. The curvature is commonly measured either via a differential capacitance technique or by laser deflection. Thus, the radius of curvature R of the wafer is measured together with the thickness $d_f$ of the film and the thickness $d_s$ of the substrate. The stress P is then found from the relation $$P = (Y_s d_s^2)/[6R(1-v_s)d_f], \qquad (2)$$

where $Y_s$ is Young's modulus for the substrate and $v_s$ is Poisson's ratio for the substrate. If the substrate takes on a shape which is convex on the side where the film is deposited, this condition indicates that the stress is compressive, i.e. P is positive.

However, the measurement of wafer curvature can only be used to indicate the average stress over a large area of the film. It cannot be used to measure stress within a small region of a film, or to find the stress in a film deposited onto a small area of the substrate.

A second known method to determine the amount of stress in a film is by Raman spectroscopy. By means of a light scattering measurement a change in the photon frequencies is measured. The change in photon frequency is proportional to the stress, and the coefficient of proportionality has been measured for a number of materials. Hence, a measurement of the shift can be used to determine the stress. However, the Raman spectroscopy measurement can only be applied to crystalline materials, is of limited accuracy, and requires a considerable amount of time to perform, all of which limit its application to the measurement of film stress in an integrated circuit processing environment.

A third known method to determine the amount of stress in a film uses X-ray diffraction to measure the stress (see, for example, P. A. Flinn et al., Journal of Applied Physics 67, 2927 (1990)). The scattering of X-rays from the film is detected and the dimension of a unit cell of the film material is determined. By comparison of the measured dimension of the unit cell with the corresponding dimensions of the unit cell in an unstressed bulk sample of the same material, the elastic strain can be determined. From the strain the stress can be calculated using the equations of elasticity. However, this X-ray method has the following limitations: 1) it can only be applied to crystalline materials; 2) it is difficult to apply to determine the stress in very small areas of a film (for example, areas with linear dimensions 10 microns); and 3) the measurement cannot be made in short time. As a consequence, the X-ray technique has limited applicability to the measurement of film stress in an integrated circuit processing environment.

In U.S. Pat. No. 5,546,811, "Optical Measurements of Stress in Thin Film Materials", Rogers et al. disclose an optical method for measuring an effect of residual stress in an unsupported film. In the technique of Rogers et al. optical excitation is used to excite an unsupported region of the film thereby generating surface propagating waveguide or "Lamb" modes in the film. A measurement of time or frequency dependent properties of the film are compared to properties of a second unsupported thin film, having known residual stress properties. In a further embodiment a determined phase velocity is compared to one calculated from a mathematical model using equations of motion for a stressed, unsupported film system.

OBJECTS OF THE INVENTION

It is thus a first object of the invention to provide a method and apparatus for the determination of mechanical stress in transparent or partially-transmitting films through the use of an optical technique that employs a short optical pulse to generate a mechanical strain pulse, and a second optical pulse to detect the propagation of the strain pulse.

It is a further object of this invention to provide a method and apparatus to non-destructively measure an amount of stress in a sample with micron or submicron resolution.

It is a further object of this invention to provide a method and apparatus for determining an amount of stress in a thin film that overcomes the foregoing and other problems, and that is furthermore suitable for use in an integrated circuit processing environment.

SUMMARY OF THE INVENTION

This invention teaches a method and a non-destructive picosecond and sub-picosecond pulse width optical system for measuring stress in a film layer disposed over a substrate. The method includes steps of (A) applying a sequence of optical pump pulses to the film layer, individual ones of said optical pump pulses inducing a propagating strain pulse in the film layer, and for each of the optical pump pulses, applying at least one optical probe pulse, the optical probe pulses being applied with different time delays after the application of the corresponding optical probe pulses; (B) detecting, in one embodiment, variations in an intensity of a reflection of portions of the optical probe pulses, the variations being due at least in part to the propagation of the strain pulse in the film layer; (C) determining, from the detected intensity variations, a sound velocity in the film layer; and (D) calculating, using the determined sound velocity, the amount of stress in the film layer.

In general, the step (B) may employ at least one of a measurement of a modulated change $\Delta R$ in an intensity of a reflected portion of a probe pulse, a change $\Delta T$ in an intensity of a transmitted portion of the probe pulse, a change $\Delta P$ in a polarization of the reflected probe pulse, a change $\Delta \phi$ in an optical phase of the reflected probe pulse, and a change in an angle of reflection $\Delta \beta$ of the probe pulse.

In one embodiment of this invention the step of detecting measures a period of an oscillation in the intensity of the reflection of portions of the optical probe pulses, while in another embodiment the step of detecting measures a change in intensity of the reflection of portions of the optical probe pulses and determines a time at which the propagating strain pulse reflects from a boundary of the film layer.

BRIEF DESCRIPTION OF THE DRAWINGS

The above set forth and other features of the invention are made more apparent in the ensuing Detailed Description of the Invention when read in conjunction with the attached Drawings, wherein:

FIG. 1A' illustrates a portion of FIG. 1A in greater detail;

DETAILED DESCRIPTION OF THE INVENTION

In accordance with the teaching of this invention, a light pulse is directed onto a sample that includes a substrate and at least one transparent or semi-transparent thin film layer disposed on or above a surface of the substrate. The light pulse is partially absorbed in the sample, which subsequently transfers energy to the materials comprising the sample. Associated with the transfer of energy is a small, localized transient change in the sample's optical response. That is, there is manifested at least one transient and measurable response of the sample to the pump pulse of optical radiation. A measured transient response or responses can include at least one of a measurement of a modulated change $\Delta R$ in an intensity of a reflected portion of a probe pulse, a change $\Delta T$ in an intensity of a transmitted portion of the probe pulse, a change $\Delta P$ in a polarization of the reflected probe pulse, a change $\Delta \phi$ in an optical phase of the reflected probe pulse, and a change in an angle of reflection $\Delta \beta$ of the probe pulse, each of which may be considered as a change in a characteristic of a reflected or transmitted portion of the probe pulse.

In a presently preferred embodiment of the teaching of this invention, the time-dependence of the change in optical reflectivity $\Delta R(t)$ of the reflected probe beam is of most interest. The observed change in reflectivity is typically in the range of about $10^{-3}$ to $10^{-5}$.

Figure 1A:
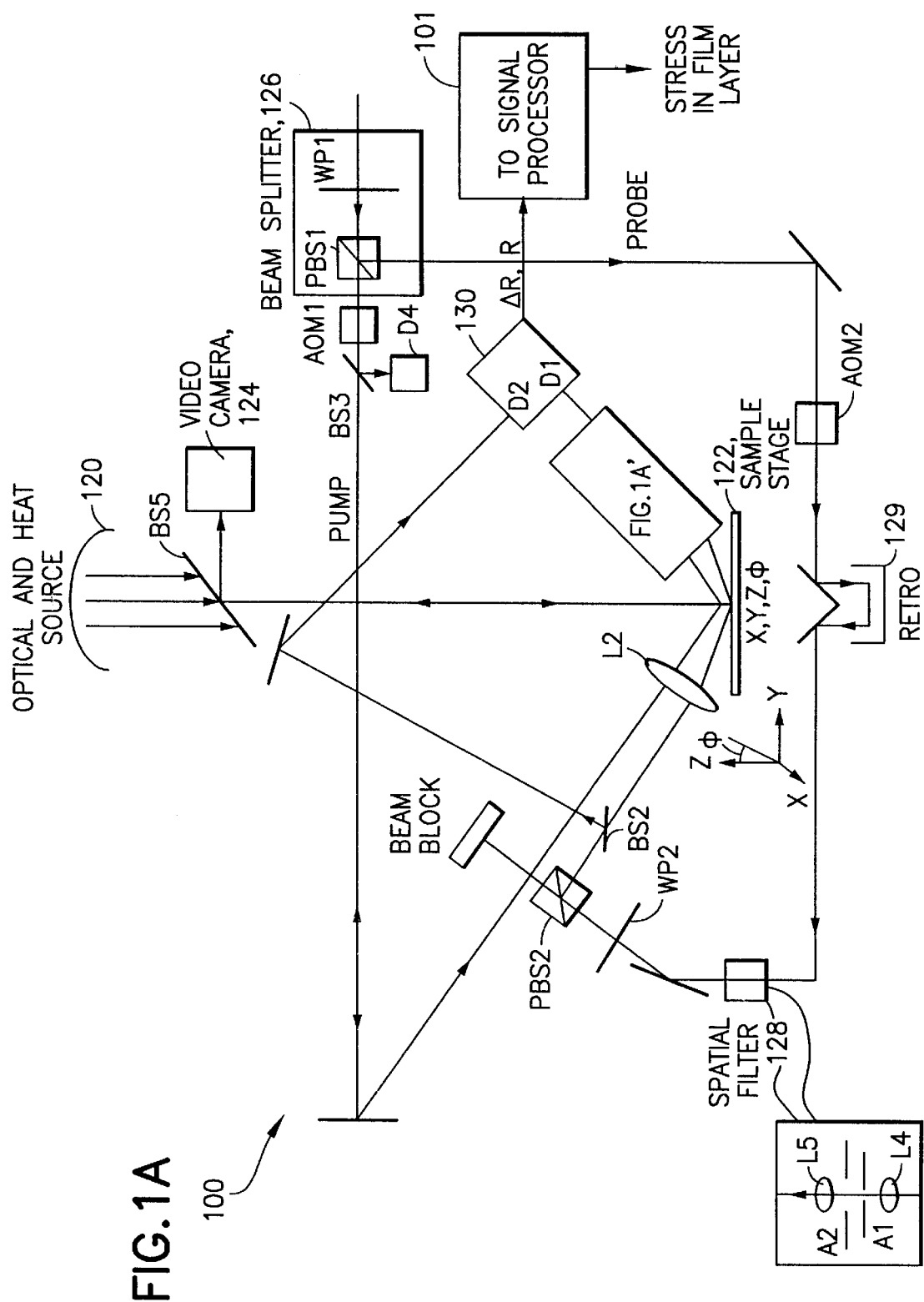
FIG. 1A is a block diagram of a first, presently preferred embodiment of an ultra-fast optical system that is suitable for use in practicing this invention, specifically, a parallel, oblique beam embodiment.
Figure 1A:
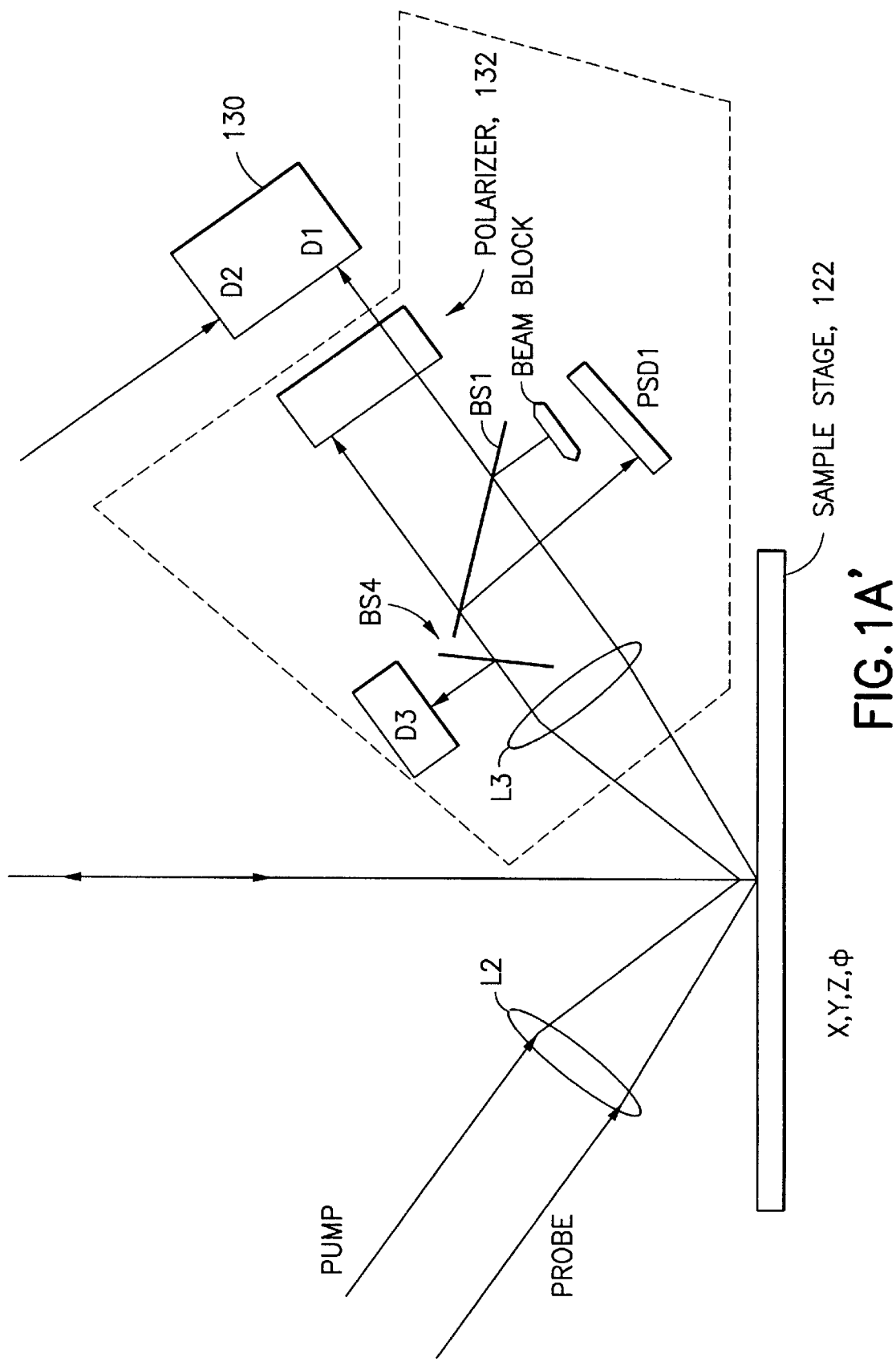

Reference is now made to FIG. 1A and FIG. 1A', collectively referred to below as FIG. 1A, for illustrating a presently preferred embodiment of apparatus 100 suitable for practicing this invention. This embodiment is referred to as a parallel, oblique embodiment.

This embodiment includes an optical/heat source 120, which functions as a variable high density illuminator, and which provides illumination for a video camera 124 and a sample heat source for temperature-dependent measurements under computer control. An alternative heating method employs a resistive heater embedded in a sample stage 122. One advantage of the optical heater is that it makes possible rapid sequential measurements at different temperatures, or at one stabilized temperature.

The video camera 124 provides a displayed image for an operator, and facilitates the set-up of the measurement system. Appropriate pattern recognition software can also be used for this purpose, thereby minimizing or eliminating operator involvement. BS5 is a broad band beam splitter that directs video and a small amount of laser light to the video camera 124. The camera 124 and processor 101 can be used to automatically position the pump and probe beams on a measurement site.

The sample stage 122 (see also FIG. 5) is preferably a multiple-degree of freedom stage that is adjustable in height (z-axis), position (x and y-axes), and optionally tilt ($\phi$), and allows motor controlled positioning of a portion of the sample relative to the pump and probe beams. The z-axis is used to translate the sample vertically into the focus region of the pump and probe, the x and y-axes translate the sample parallel to the focal plane, and the tilt axes adjust the orientation of the stage 122 to establish a desired angle of incidence for the probe beam. This is achieved via position sensitive detector PSD1 and a signal processor 101, as described below.

In an alternative embodiment, the optical head may be moved relative to a stationary, tiltable stage 122' (not shown). This is particularly important for scanning large objects (such as 300 mm diameter wafers, or mechanical structures, etc.) In this embodiment the pump beam, probe beam, and video signal can be delivered to or from the translatable head via optical fibers or fiber bundles.

The pump-probe beam splitter 126 splits an incident laser beam pulse (preferably of picosecond or shorter duration) into pump and probe beams, and includes a rotatable half-wave plate (WP1) that rotates the polarization of the unsplit beam. WP1 is used in combination with polarizing beam splitter PBS1 to effect a continuously variable split between pump and probe power. This split may be controlled by the computer by means of a motor to achieve an optimal signal to noise ratio for a particular sample. The appropriate split depends on factors such as the reflectivity and roughness of the sample. Adjustment is effected by having a motorized mount rotate WP1 under computer control.

A first acousto-optic modulator (AOM1) chops the pump beam at a frequency of about 1 MHZ. A second acousto-optic modulator (AOM2) chops the probe beam at a frequency that differs by a small amount from that of the pump modulator AOM1. The use of AOM2 is optional in the system illustrated in FIG. 1A. Optionally, the AOMs may be synchronized to a common clock source, and may further be synchronized to the pulse repetition rate (PRR) of the laser that generates the pump and probe beams. Optionally an electro-optic modulator can be used in place of acousto-optic modulators AOM1 or AOM2.

A spatial filter 128 is used to preserve at its output a substantially invariant probe beam profile, diameter, and propagation direction for an input probe beam which may vary due to the action of the mechanical delay line shown as a retroreflector 129. The spatial filter 128 includes a pair of apertures A1 and A2, and a pair of lenses L4 and L5. An alternative embodiment of the spatial filter incorporates an optical fiber, as described above. If the profile of the probe beam coming from the mechanical delay line does not vary appreciably as the retroreflector 129 is moved, the spatial filter 128 can be omitted.

WP2 is a second adjustable halfwave plate which functions in a similar manner with PBS2 to the WP1/PBS1 combination of the beam splitter 126. The part of the beam passing through the beam splitter PBS1 impinges on a beam block. Beam splitter BS2 is used to direct a small fraction of the probe beam onto reference detector D2. The output of D2 is amplified and sent through a low pass filter to give an electrical signal LF2 which is proportional to the average intensity of the incident probe beam.

The probe beam after passing through BS2 is focused onto the sample by lens L2. After reflection from the sample the beam is collimated and after passing polarizer 132 is incident on photodetector D1. From the output of D1 two electrical signals are derived. The first signal LF1 is obtained by passing the amplified output of D1 through a low pass filter to give an electrical signal proportional to the average intensity of the incident probe beam. The second signal HF1 is obtained by passing the amplified output of D1 through a high pass filter which passes the frequency of modulation used for AOM1.

The low frequency signals LF1 and LF2 can be used to determine the reflectivity of the sample, after allowance is made for fixed losses in both optical paths. The signal LF2 and the average (dc) output of detector D4 give a measure of the intensity of the pump and probe beams. These signals are fed to a computer, for example the signal processor 101, which in turn controls motorized waveplates WP1 and WP2. The computer is programmed to adjust these waveplates so as to give the desired total optical power and pump/probe ratio for a sample exhibiting a particular reflectivity.

The linear polarizer 132 is employed to block scattered pump light polarization, and to pass the probe beam. The beamsplitter BS1 is used to direct a small part of the pump beam, and optionally a small part of the probe beam, onto a first Position Sensitive Detector (PSD1) that is used for autofocusing, in conjunction with the processor 101 and movements of the sample stage 122. The PSD1 is employed in combination with the processor 101 and the computer-controlled stage 122 (tilt and z-axis) to automatically focus the pump and probe beams onto the sample to achieve a desired focusing condition.

The detector D1 may be used in common for reflectometry, ellipsometry, and transient optical embodiments of this invention. However, the resultant signal processing is different for each application. For transient optical measurements, the DC component of the signal is suppressed, such as by subtracting reference beam input D2, or part of it as needed, to cancel the unmodulated part of D1, or by electrically filtering the output of D1 so as to suppress frequencies other than that of the modulation. The small modulated part of the signal is then amplified and stored. For ellipsometry, there is no small modulated part, rather the entire signal is sampled many times during each rotation of the rotating compensator (see discussion of FIG. 1B below), and the resulting waveform is analyzed to yield the ellipsometric parameters. For reflectometry, the change in the intensity of the entire unmodulated probe beam due to the sample is determined by using the D1 and D2 output signals (D2 measures a signal proportional to the intensity of the incident probe). Similarly, additional reflectometry data can be obtained from the pump beam using detectors D3 and D4. The analysis of the reflectometry data from either or both beams may be used to characterize the sample. The use of two beams is useful for improving resolution, and for resolving any ambiguities in the solution of the relevant equations.

A third beamsplitter BS3 is used to direct a small fraction of the pump beam onto detector D4, which measures a signal proportional to the incident pump intensity. A fourth beamsplitter BS4 is positioned so as to direct a small fraction of the pump beam onto detector D3, which measures a signal proportional to the reflected pump intensity.

Figure 1B:
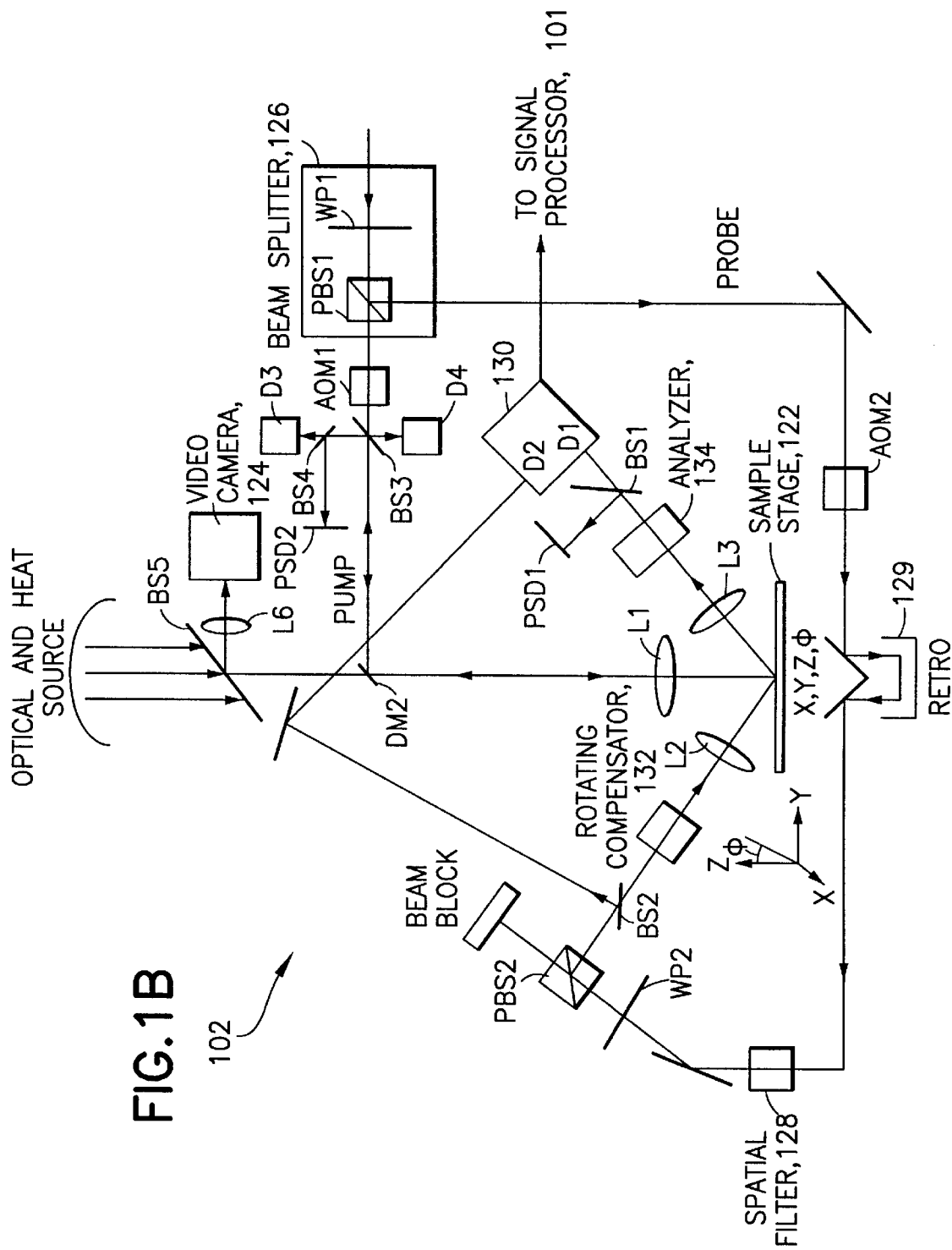
FIG. 1B is a block diagram of a second embodiment of an ultra-fast optical system that is suitable for use in practicing this invention, specifically, a normal pump, oblique probe embodiment.

FIG. 1B illustrates a normal pump beam, oblique probe beam embodiment of apparatus 102. Components labelled as in FIG. 1A function in a similar manner, unless indicated differently below. In FIG. 1B there is provided the above-mentioned rotating compensator 132, embodied as a linear quarter wave plate on a motorized rotational mount, and which forms a portion of an ellipsometer mode of the system. The plate is rotated in the probe beam at a rate of, by example, a few tens of Hz to continuously vary the optical phase of the probe beam incident on the sample.

The reflected light passes through an analyzer 134 and the intensity is measured and transferred to the processor 101 many times during each rotation. The signals are analyzed according to known types of ellipsometry methods to determine the characteristics of the sample (transparent or semi-transparent films). This allows the (pulsed) probe beam to be used to carry out ellipsometry measurements.

The ellipsometry measurements are carried out using a pulsed laser, which is disadvantageous under normal conditions, since the bandwidth of the pulsed laser is much greater than that of a CW laser of a type normally employed for ellipsometry measurements.

The ellipsometry measurement capability is useful in performing certain of the embodiments of the method described below, wherein it is required to determine the index of refraction of a film layer disposed over a substrate.

If transient optical measurements are being made, the rotating compensator 132 is oriented such that the probe beam is linearly polarized orthogonal to the pump beam. The analyzer 134 may be embodied as a fixed polarizer, and also forms a portion of the ellipsometer mode of the system. When the system is used for transient optical measurements the polarizer 134 is oriented to block the pump.

The analyzer 134 may be embodied as a fixed polarizer, and also forms a portion of the ellipsometer mode of the system. When used in the ellipsometer mode, the polarizer 134 is oriented so as to block light polarized at 45 degrees relative to the plane of the incident and reflected probe beam.

The embodiment of FIG. 1B further includes a dichroic mirror (DM2), which is highly reflective for light in a narrow band near the pump wavelength, and is substantially transparent for other wavelengths.

It should be noted in FIG. 1B that BS4 is moved to sample the pump beam in conjunction with BS3, and to direct a portion of the pump to D3 and to a second PSD (PSD2). PSD2 (pump PSD) is employed in combination with the processor 101, computer controlled stage 122 (tilt and z-axis), and PSD1 (Probe PSD) to automatically focus the pump and probe beams onto the sample to achieve a desired focusing condition. Also, a lens L1 is employed as a pump, video, and optical heating focussing objective, while an optional lens L6 is used to focus the sampled light from BS5 onto the video camera 124.

Figure 1C:
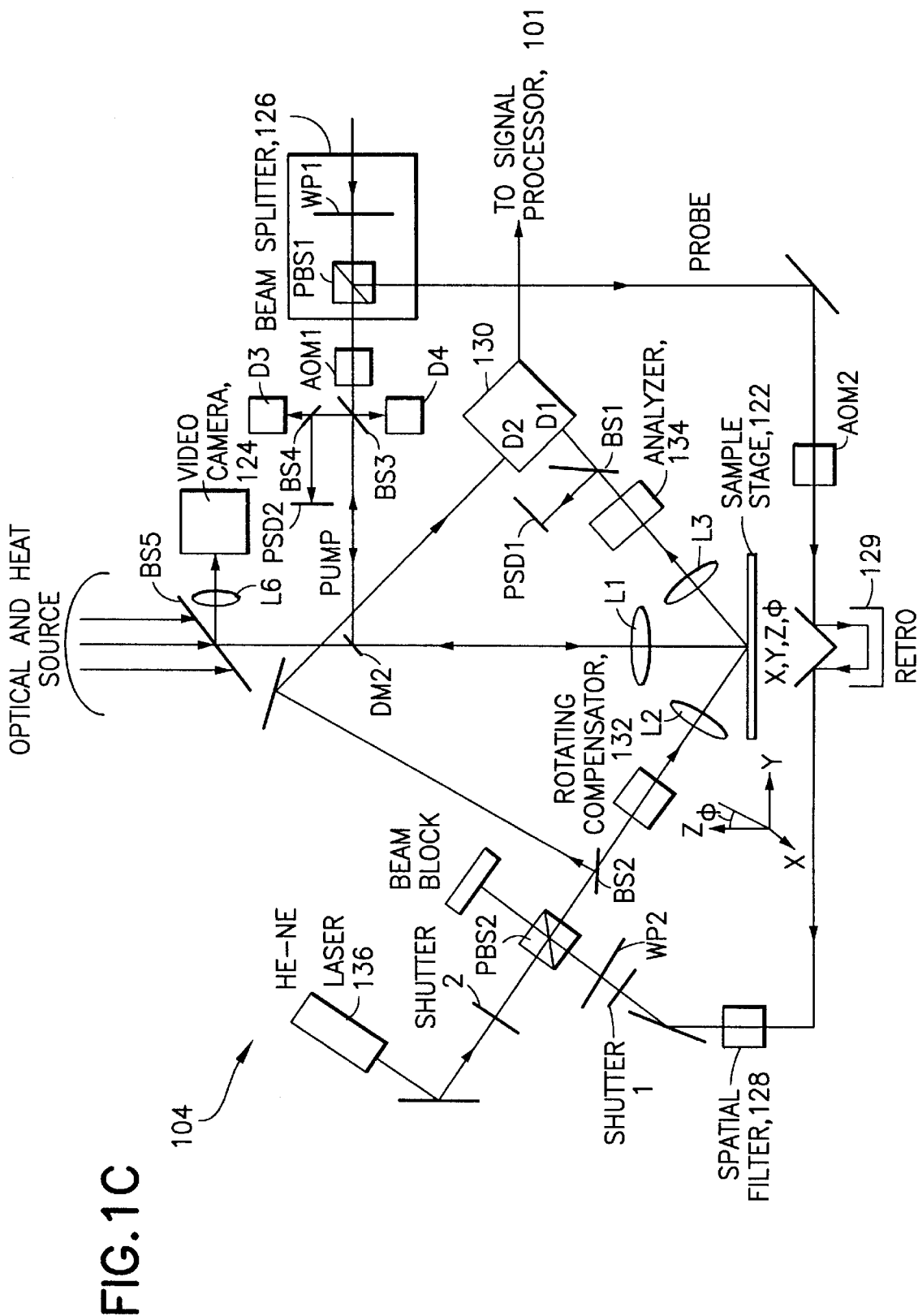
FIG. 1C is a block diagram of a third embodiment of an ultra-fast optical system that is suitable for use in practicing this invention, specifically, a single wavelength, normal pump, oblique probe, combined ellipsometer embodiment.

Reference is now made to FIG. 1C for illustrating an embodiment of apparatus 104, specifically a single wavelength, normal pump, oblique probe, combined ellipsometer embodiment. As before, only those elements not described previously will be described below.

Shutter 1 and shutter 2 are computer controlled shutters, and allow the system to use a He—Ne laser 136 in the ellipsometer mode, instead of the pulsed probe beam. For transient optical measurements shutter 1 is open and shutter 2 is closed. For ellipsometer measurements shutter 1 is closed and shutter 2 is opened. The HeNe laser 136 is a low power CW laser, and has been found to yield superior ellipsometer performance for some films.

Figure 1D:
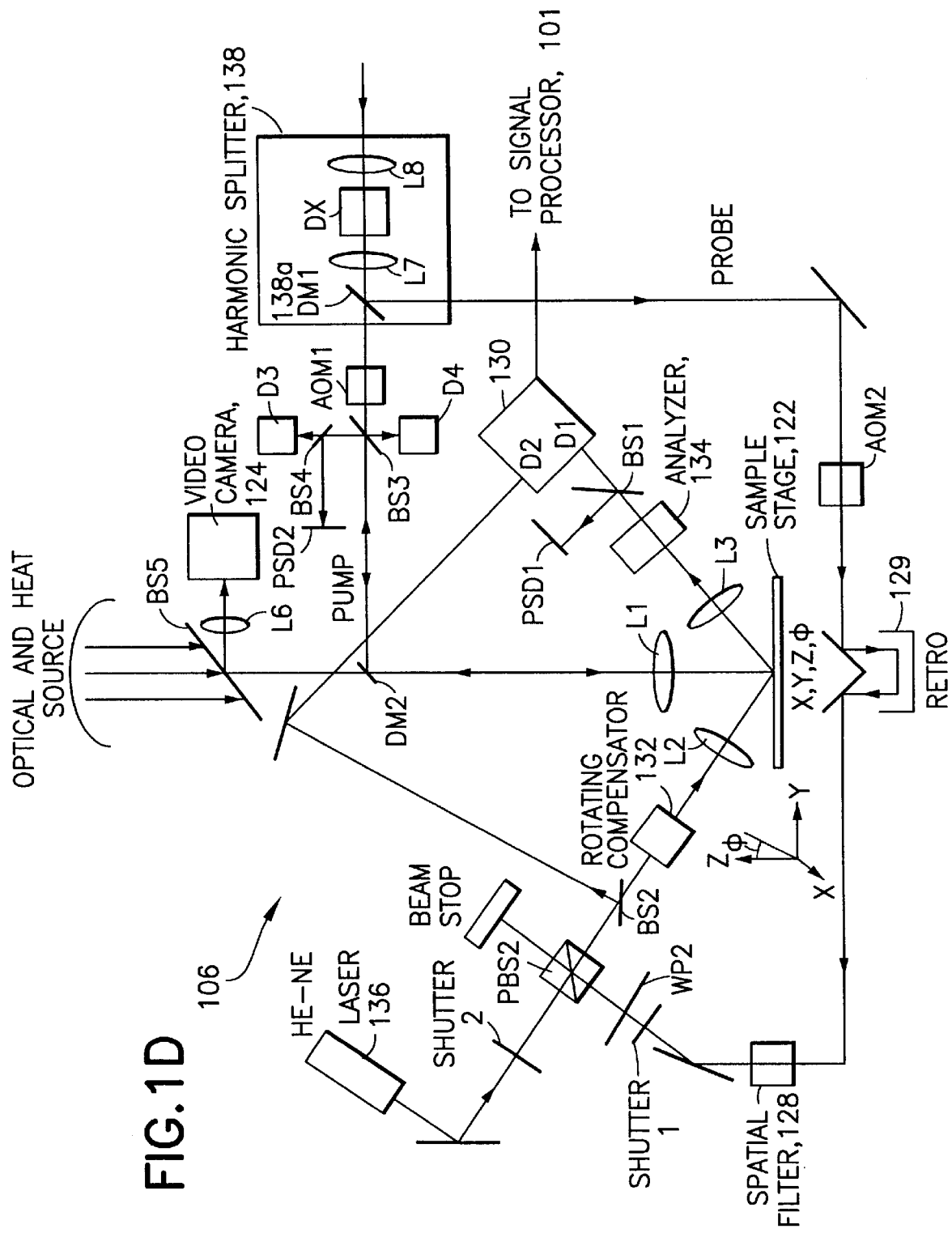
FIG. 1D is a block diagram of a fourth embodiment of an ultra-fast optical system that is suitable for use in practicing this invention, specifically, a dual wavelength, normal pump, oblique probe, combined ellipsometer embodiment.

FIG. 1D is a dual wavelength embodiment 1D of the system illustrated in FIG. 1C. In this embodiment the beamsplitter 126 is replaced by a harmonic splitter, an optical harmonic generator that generates one or more optical harmonics of the incident unsplit incident laser beam. This is accomplished by means of lenses L7, L8 and a nonlinear optical material (DX) that is suitable for generating the second harmonic from the incident laser beam. The pump beam is shown transmitted by the dichroic mirror (DM1 138a) to the AOM1, while the probe beam is reflected to the retroreflector. The reverse situation is also possible. The shorter wavelength may be transmitted, and the longer wavelength may be reflected, or vice versa. In the simplest case the pump beam is the second harmonic of the probe beam (i.e., the pump beam has one half the wavelength of the probe beam).

It should be noted that in this embodiment the AOM2 can be eliminated and instead a color filter F1 can be used in front of the detector D1 in order to reduce the amount of light reaching the detector D1. F1 is a filter having high transmission for the probe beam and the He—Ne wavelengths, but very low transmission for the pump wavelength.

Figure 1E:
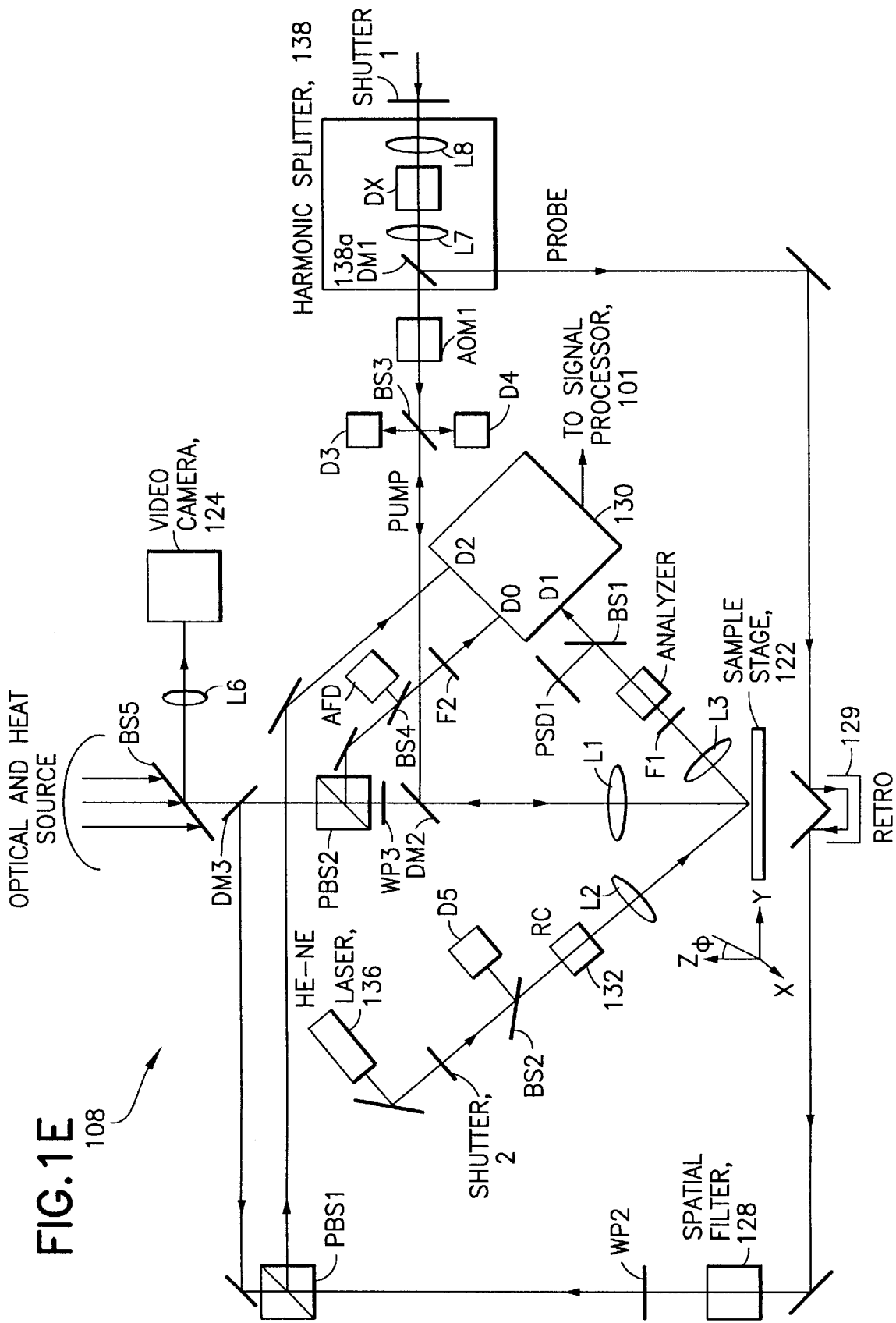
FIG. 1E is a block diagram of a fifth embodiment of an ultra-fast optical system that is suitable for use in practicing this invention, specifically, a dual wavelength, normal incidence pump and probe, combined ellipsometer embodiment.

Finally, FIG. 1E illustrates a normal incidence, dual wavelength, combined ellipsometer embodiment 108. In FIG. 1E the probe beam impinges on PBS2 and is polarized along the direction which is passed by the PBS2. After the probe beam passes through WP3, a quarter wave plate, and reflects from the sample, it returns to PBS2 polarized along the direction which is highly reflected, and is then directed to a detector D0 in detector block 130. D0 measures the reflected probe beam intensity.

In greater detail, WP3 causes the incoming plane polarized probe beam to become circularly polarized. The handedness of the polarization is reversed on reflection from the sample, and on emerging from WP3 after reflection, the probe beam is linearly polarized orthogonal to its original polarization. BS4 reflects a small fraction of the reflected probe onto an Autofocus Detector AFD.

DM3, a dichroic mirror, combines the probe beam onto a common axis with the illuminator and the pump beam. DM3 is highly reflective for the probe wavelength, and is substantially transparent at most other wavelengths.

D1, a reflected He—Ne laser 136 detector, is used only for ellipsometric measurements.

It should be noted that, when contrasting FIG. 1E to FIGS. 1C and 1D, that the shutter 1 is relocated so as to intercept the incident laser beam prior to the harmonic splitter 138.

Based on the foregoing descriptions, a selected one of these presently preferred embodiments of measurement apparatus provide for the characterization of samples in which a short optical pulse (the pump beam) is directed to an area of the surface of the sample, and then a second light pulse (the probe beam) is directed to the same or an adjacent area at a later time. The retroreflector 129 shown in all of the illustrated embodiments of FIGS. 1A–1E can be employed to provide a desired temporal separation of the pump and probe beams.

The apparatus 100, 102, 104, 106 and 108, as described above, are capable of measuring the (1) transient change in the reflectivity of the probe beam. With suitable modifications the apparatus can be used to measure (2) the change $\Delta T$ in the intensity of the transmitted probe beam, (3) the change $\Delta P$ in the polarization of the reflected probe beam, (4) the change $\Delta \phi$ in the optical phase of the reflected probe beam, and/or (5) the change in the angle of reflection $\Delta \beta$ of the probe beam. These quantities may all be considered as transient responses of the sample which are induced by the pump pulse. These measurements can be made together with one or several of the following: (a) measurements of any or all of the quantities (1)–(5) just listed as a function of the incident angle of the pump or probe light, (b) measurements of any of the quantities (1)–(5) as a function of more than one wavelength for the pump and/or probe light, (c) measurements of the optical reflectivity through measurements of the incident and reflected average intensity of the pump and/or probe beams; (d) measurements of the average phase change of the pump and/or probe beams upon reflection; and/or (e) measurements of the average polarization and optical phase of the incident and reflected pump and/or probe beams. The quantities (c), (d) and (e) may be considered to be average or static responses of the sample to the pump beam.

Figure 2:
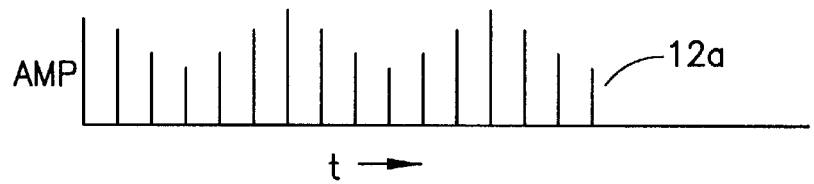
FIG. 2 illustrates a pulse train of pump beam pulses having an overlying low frequency intensity modulation impressed thereon.

Typical characteristics of the light pulses employed in the systems 100–108 of FIGS. 1A–1E are as follows. The pump pulse has an energy of approximately 0.001 to 100 nJ per pulse, a duration of approximately 0.01 psecs to 100 psec per pulse, and a wavelength in the range 200 nm to 4000 nm. The pulse repetition rate (PRR) is in the range of 100 Hz to 5 GHz and, as is shown in FIG. 2, the pump pulse train may be intensity modulated at a rate of 1 Hz to 100 MHz, depending on the PRR. The pump pulse is focussed to form a spot on the sample surface of diameter in the range of approximately 10 micrometers to 20 micrometers, although smaller spot sizes, and hence smaller lateral resolutions, can also be employed.

The five embodiments 100, 102, 104, 106 and 108, as described above, have in common the feature that a sequence of pump pulses are generated and directed at the surface of the sample. Each pump pulse illuminates the same area of the sample with an intensity that varies smoothly across the area. However, it is also within the scope of this invention to make measurements of the transient optical response by means of an induced transient grating method, such as one described by Phillion et al. (D. W. Phillion, D. J. Kuizenga, and A. E. Siegman, Appl. Phys. Lett. 27, 85 (1975)).

Figure 1F:
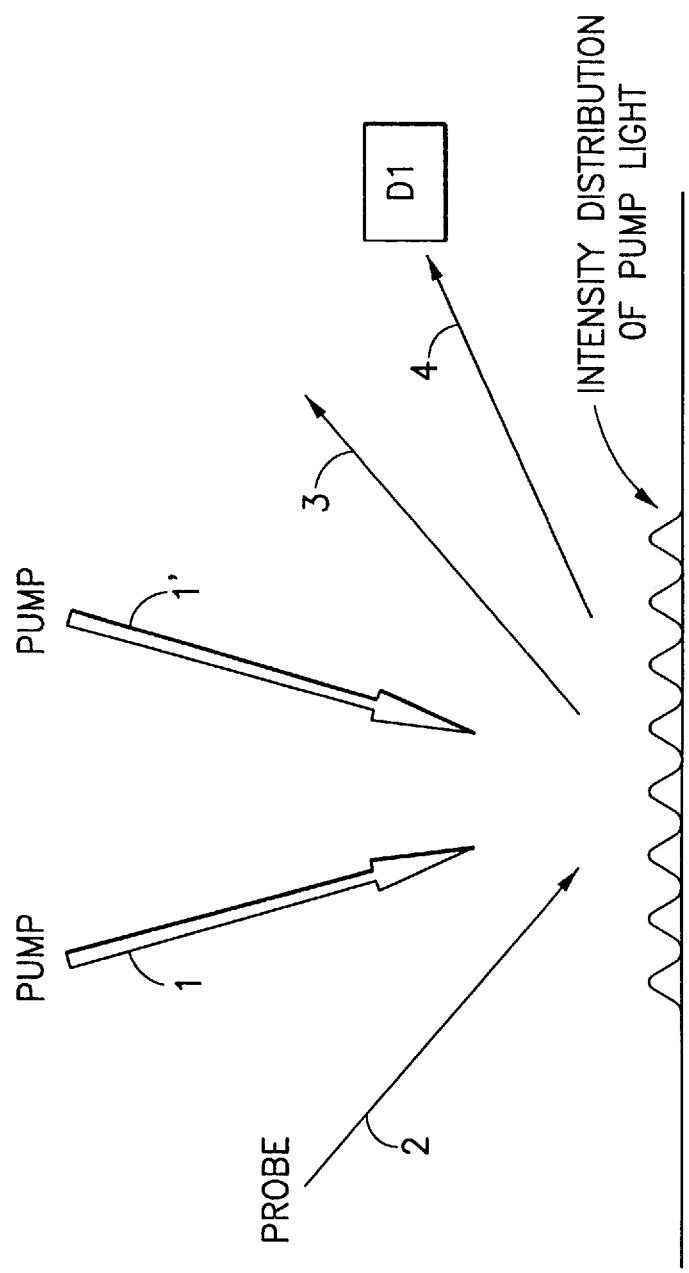
FIG. 1F depicts a simultaneous application of multiple pump pulses at different angles for inducing a transient optical grating, in accordance with a further embodiment of this invention.

Referring now to FIG. 1F, to induce a transient grating each pump pulse is divided into two or more components by means of a beam splitter or beam splitters, these components then pass through separate optical paths, and are then all directed onto the same area of the surface of the sample. If the different components are directed onto the surface with different angles there will be locations within the area where the different components interfere constructively and other locations where the interference is destructive. Thus the total intensity of the pump light varies across the sample surface. In the case that only two components 1 and 1' are present, as shown in FIG. 1F, the intensity will vary periodically across the same surface. The periodicity of the intensity, i.e. the spacing between successive points of maximum intensity, is determined by the wavelength of the pump light and the angles at which the different components of the pump light are incident onto the surface. In this case the amount of light absorbed in the structure will vary periodically across the surface, and the amplitude of the generated stress pulse will also vary periodically across the surface. Consequently, the transient changes in the optical properties of the sample which result from the propagation of the stress pulse will in turn vary periodically across the surface of the sample. This variation of the transient changes in the optical properties of the sample is equivalent to the production of a transient diffraction grating coinciding with the sample surface. When probe light 2 is incident on the area excited by the pump, a part 4 of the probe light will be diffracted, i.e. a part of the probe light will be reflected in a direction, or directions, away from the direction 3 of specular reflection. Measurement of the intensity of this diffracted probe light by means of the detector D1 as a function of the time delay t between the application of the pump and probe beams provides an alternate method for the characterization of the transient optical response produced by the propagating stress pulse.

Figure 3A:
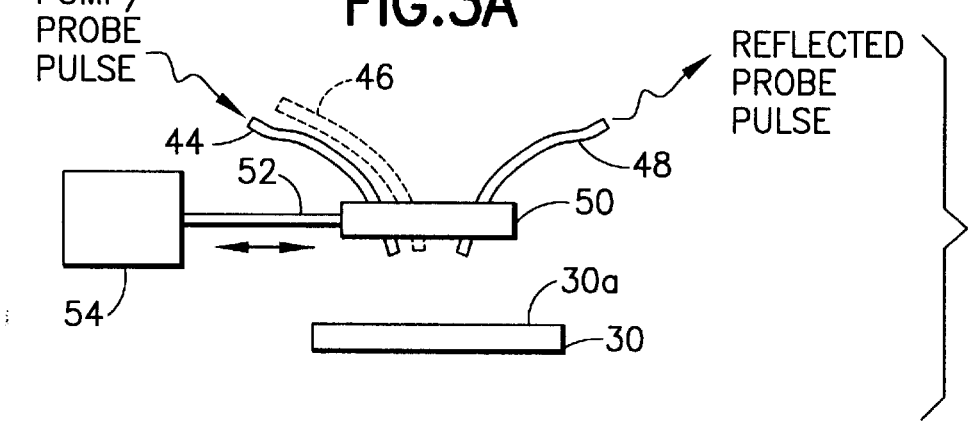
FIG. 3A illustrates a further embodiment wherein one or more optical fibers are positioned for delivering the pump beam and/or probe beam and for conveying away the reflected probe beam.

Referring to FIG. 3A, it is also within the scope of the teaching of this invention to deliver the pump pulse, or the probe pulse, or both the pump and probe pulses, through an optical fiber 44. Alternatively, a second input fiber 46 can be provided, whereby the pump pulse is delivered through the fiber 44 and the probe pulse is delivered through the fiber 46. Another fiber 48 can also be employed for receiving the reflected probe pulse and delivering same to the photodetector 34. For this embodiment the end of the optical fiber(s) are affixed to and supported by a holding stage 50. The holding stage 50 is preferably coupled through a member 52 to an actuator 54, such as a linear actuator or a two degree of freedom positioning mechanism. In this manner the reliability and repeatability of the measurement cycle is improved, in that the size and position of the focussed pump, probe, or pump and probe beams on the sample surface are independent of minor changes in the direction or profile of the laser output beams, or changes in the profile of the probe beam associated with the motion of any mechanical stage that may be used to effect the delay $t_D$. Preferably, the angular orientation between the end of the probe beam delivery fiber and the end of the reflected probe beam fiber is such as to optimize the gathering of reflected probe beam light from the sample surface. It is also within the scope of this invention to use one or more lenses following the fiber or fibers, in order to focus the output beams from the fibers onto the sample surface, or to collect the reflected probe light and to direct it into the fiber 48 of FIG. 3A.

Figure 3B:
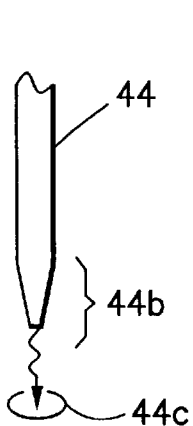
FIG. 3B illustrates a terminal end of a fiber optic that has been reduced in cross-sectional area for delivering an optical pulse to a small surface area of a sample.

FIG. 3B shows an embodiment wherein a terminal portion 44b of a pump and/or probe beam delivery fiber 44a is reduced in diameter, such as by stretching the fiber, so as to provide a focussed spot 44c having a diameter that is less than the normal range of optical focussing. When coupled with the embodiment of FIG. 3A this enables the pump and or probe optical pulse to be repeatably delivered to a very small region of the sample surface (e.g., to a spot having a diameter $\leq$ one micrometer), regardless of any changes that are occurring in the optical path length of the probe beam.

Figure 3C:
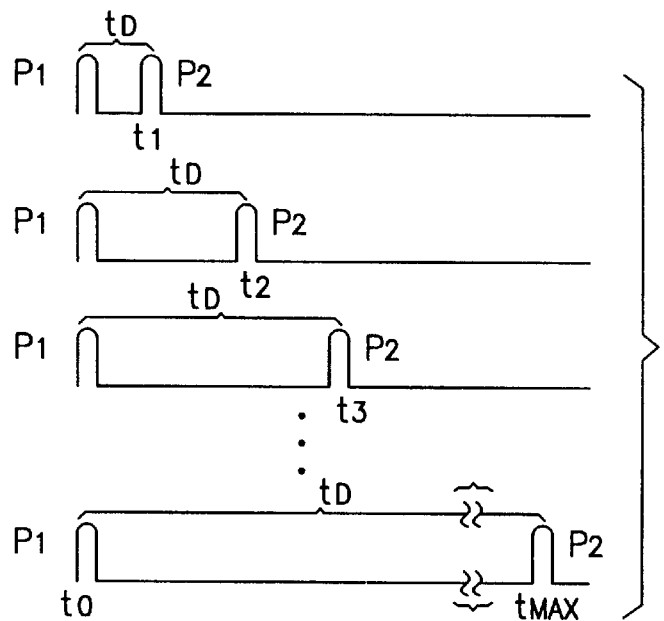
FIG. 3C illustrates various time delays between the application of a pump pulse and a subsequent application of a probe pulse.

FIG. 3C illustrates various time delays ($t_D$) between the application of a pump pulse (P1) and a subsequent application of a probe pulse (P2), for times ranging from $t_1$ to $t_{MAX}$.

Having thus described a number of presently preferred embodiments of apparatus for obtaining measurements of a sample, the following description will focus on the use of this apparatus to measure the stress in a thin film layer of the sample.

What follows is a description of a method and a system in accordance with this invention for the characterization of stress in a thin film layer through the use of a short pump light pulse to excite the material to be investigated, and an optical probe to examine the material a short time after the application of the pump pulse. A time-dependent change in the optical constants of the material, which may be manifested by a change in, by example, reflectivity or polarization, is measured and is associated with an amount of stress present in the thin film layer.

The method is applied to a film F which is transparent, or which absorbs light only weakly such that sufficient light can pass through the film so that the following measurements can be made.

Figure 4:
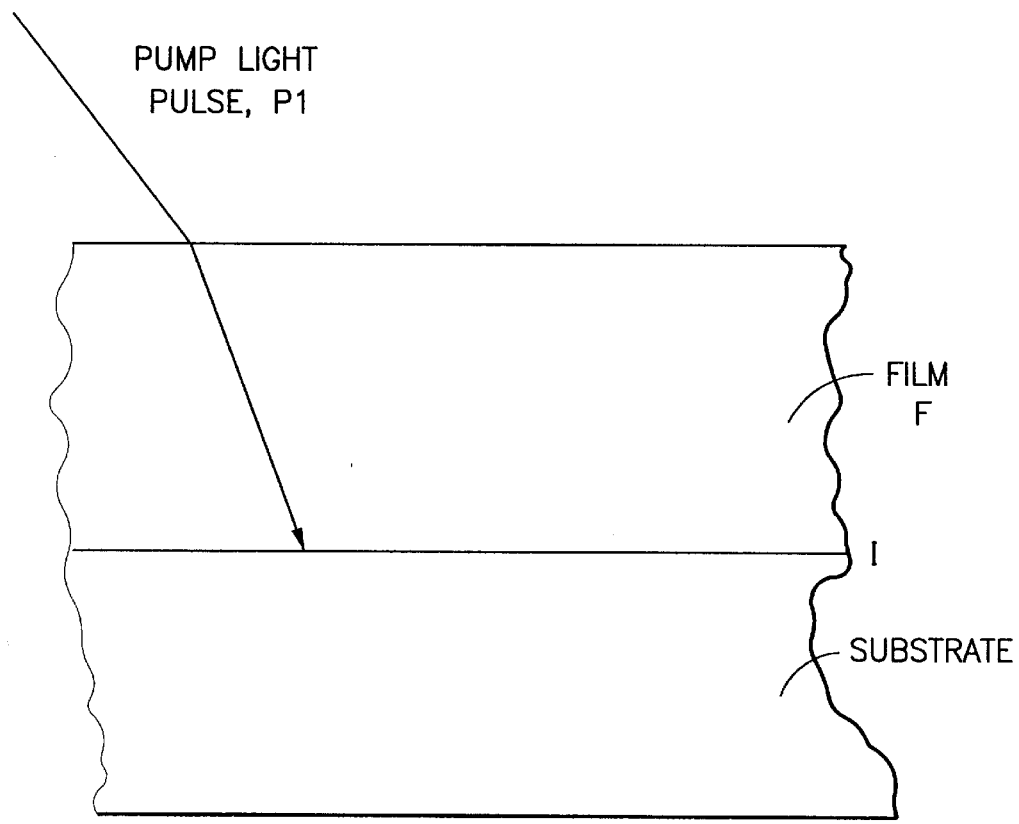
FIG. 4 is an enlarged cross-sectional view of a film layer disposed on a substrate, and the application of a pump light pulse P1.
Figure 5:
FIG. 5 is an enlarged cross-sectional view of the film layer disposed on the substrate, and counter-propagating strain pulses induced by the pump pulse of FIG. 4.
Figure 5:
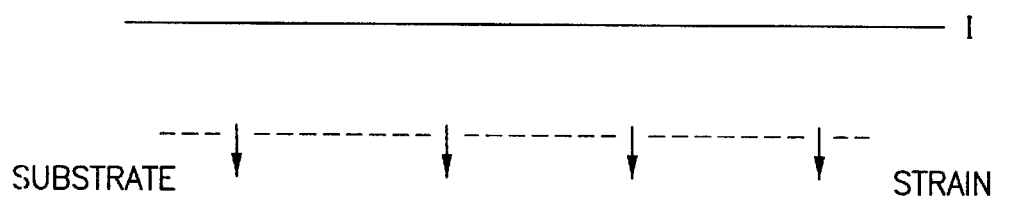

Reference is made to FIG. 4. A short duration light pulse P1 (the pump light pulse) is directed onto an area of the film F. The light is absorbed in the substrate. A stress is produced in the region where the light is absorbed. As a result of this suddenly-produced stress, a strain pulse S1 is launched which propagates into the film F (FIG. 5). A strain pulse S2 which propagates into the substrate will also be generated.

The propagation of the strain pulse S1 is detected through a measurement of the change in the optical properties of the structure. These changes are determined by means of the time delayed probe light pulse P2 applied at a time t after the application of the pump pulse P1. The probe pulse P2 is directed onto the same region of the film where the pump light pulse was absorbed and where the strain was generated.

The propagating strain causes a transient optical response (TOR) comprising a change in a) the intensity of the reflected probe light, b) the intensity of the transmitted probe light, c) the polarization of the reflected and/or transmitted probe light, d) the phase of the reflected and/or transmitted probe light, e) the propagation direction of the reflected and/or transmitted probe light, and f) a change in the optical path length between the sample's surface and a detector. These changes arise because, when the probe light pulse P2 propagates through the film F, it is partially reflected at the strain pulse S1. A measurement of one or more of these transient optical responses can be used to deduce the sound velocity v in the film F. This determination of the sound velocity may be carried out by one or more of the following three methods. The descriptions of the three methods which are given below refer to the particular example in which the change $\Delta I_{probe-refl}(t)$ in the intensity of the reflected probe light is the TOR which is measured; the method to be used to determine the sound velocity through the measurement of other TOR will be clear to those skilled in the art.

Figure 6:
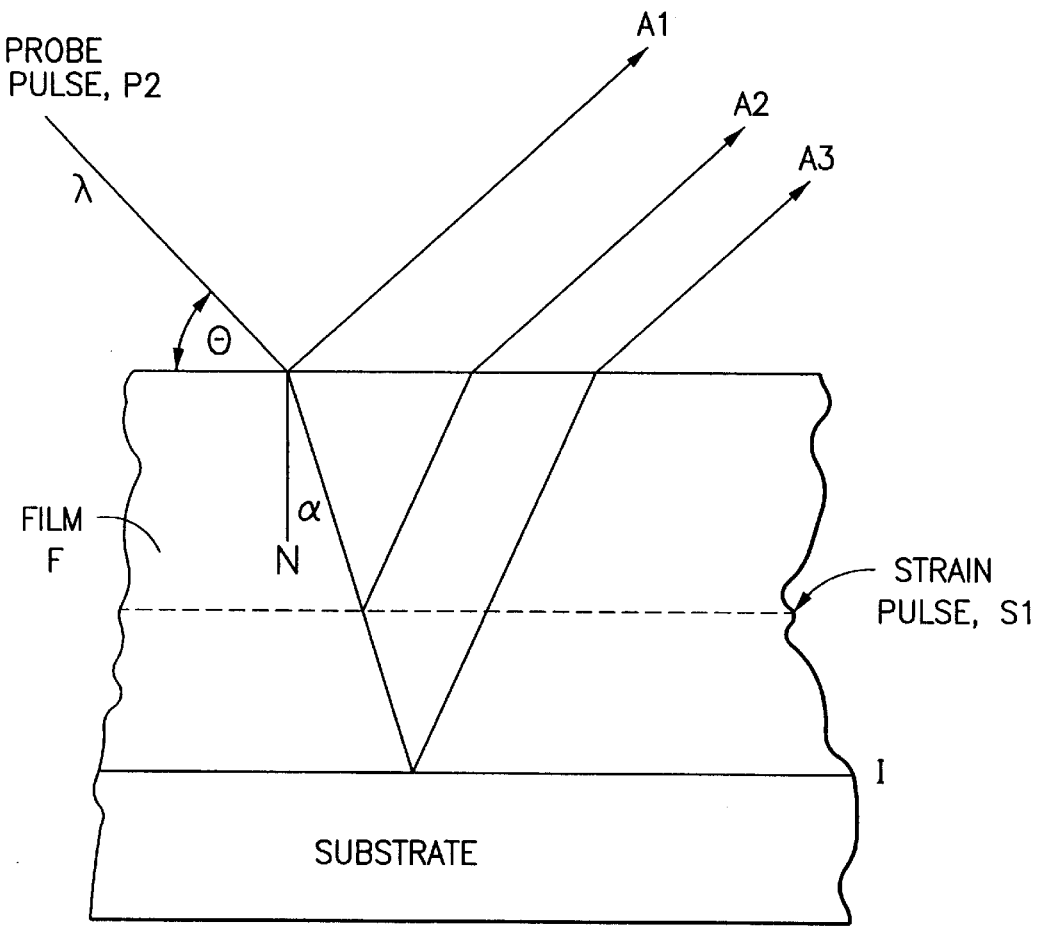
FIG. 6 is an enlarged cross-sectional view of the film layer disposed on the substrate, and further showing the interaction of a probe pulse with the propagating strain pulse in the film layer.

When the probe light pulse is directed at the sample it is partially reflected at the upper surface of the film F, at the propagating strain pulse S1, and at the interface (I) between the film F and the substrate. These three reflections give rise to the three components A1, A2, and A3 of the reflected probe light, respectively, as shown in FIG. 6. The amplitudes of A1 and A3 are much larger than the amplitude of the component A2 arising from the reflection of light at the strain pulse S1. There will typically also be some further components A4, A5, etc. (not shown) which arise from multiple reflections of the light at the surfaces of the film or at the strain pulse; for simplicity these are not included in the description given below.

The optical phase of the components A1 and A3 is fixed. However, the phase of the component A2 varies with time because the strain pulse is moving and, hence, the plane in space on which the reflection occurs is different at different times. As a result of the propagation of the strain pulse S1, as time passes the component A2 interferes constructively or destructively with the sum of the reflected components A1 and A3 according to the difference in the optical path lengths that the three components have traveled. The optical path length for the component A2 changes at a rate determined by the velocity with which the strain pulse is propagating, and is also dependent on the angle α between the direction of propagation of the light in the film F and the direction normal to the surface of the film F. It can be shown that while the strain pulse S1 is propagating towards the upper (free) surface of the film F the rate of change of the optical path of component A2 is such that the interference between A2 and the other two components passes from constructive to destructive and back to constructive over a characteristic time interval which is $$\tau_{osc} = \lambda/2nv \cos(\alpha), \tag{3}$$

where λ is the wavelength of light, and n is the refractive index of the film.

Figure 7:
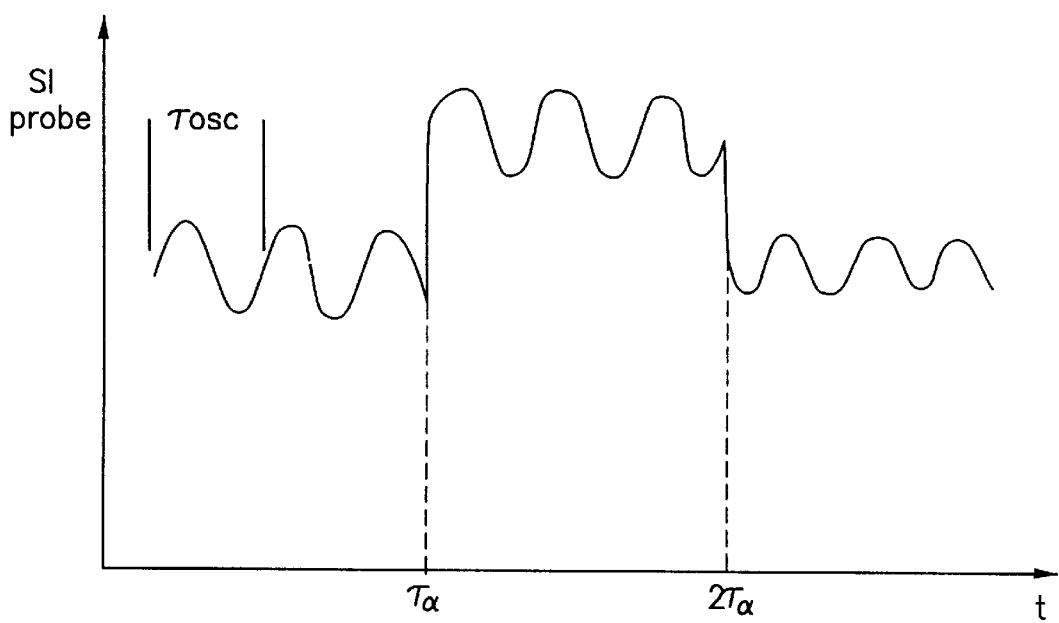
FIG. 7 is a graph that illustrates a change in the reflected probe pulse intensity over time due to the strain pulse in the film layer reflecting from the top surface of the film layer.

Referring now also to FIG. 7, as a consequence the intensity $\Delta I_{probe-refl}(t)$ of the reflected probe light oscillates as a function of the probe pulse delay t with the period $\tau_{osc}$. This behavior is observed during the time interval from the application of the pump pulse P1 (for convenience taken to be at t=0) up to the time $\tau_d$ at which the strain pulse S1 reaches the top surface of the film F (FIG. 2). After the strain pulse is reflected from the upper surface of the film the oscillations continue but with a phase which has undergone an abrupt shift at time $\tau_d$. There is also an abrupt change in $\Delta I_{probe-refl}(t)$ (increase or decrease depending on the characteristics of the sample) at the time $\tau_d$. The change in probe intensity arises because when the strain pulse S1 is reflected at the top surface of the film F the sign of the strain changes, i.e., if the strain pulse S1 originally corresponded to a compression of the material of the film F it changes to dilation, or vice versa. This behavior of $\Delta I_{probe-refl}(t)$ is shown qualitatively in FIG. 7. After the time $2\tau_d$ the strain pulse has returned to the bottom of the film F (the interface I between the film F and the substrate). It is then partially reflected back into the film F and partially transmitted into the substrate.

Consequently at time $2\tau_d$ there is another abrupt change in the phase of the oscillations. In addition, after this time the amplitude of the oscillations decreases because the amplitude of the strain pulse in the film has decreased due to partial transmission of the strain pulse into the substrate. The second phase change at time $2\tau_d$ and the reduction in the amplitude of oscillations in $\Delta I_{probe-refl}(t)$ is also shown in FIG. 7. At later times the strain pulse will continue to reflect back and forth in the film F with decreasing amplitude.

In accordance with preferred embodiments of this invention, the signal processor 101 coupled to a desired one of the systems shown in FIGS. 1A–1E executes one of three methods (A–C) for the determination of the sound velocity in the film F, and then calculates the amount of stress in the film layer F using the determined sound velocity. The three methods are as follows.

A) The period $\tau_{osc}$ of the oscillations in the intensity $\Delta I_{probe-refl}(t)$ of the reflected probe light is measured for probe light of a known wavelength λ. The refractive index n of the film is determined by, for example, ellipsometry. The angle θ at which light is incident onto the film structure is measured and the angle α is calculated from the refractive index n through the use of Snell's law of refraction:

$$\sin(\alpha) = \sin(\theta)/n \tag{4}$$

The sound velocity is then calculated from Eq. 3.

B) The period $\tau_{osc}$ is measured for probe light of a known wavelength λ at a series of incident angles θ. By combination of Eqs. 3 and 4 the dependence of $\tau_{osc}$ on the angle θ is given by the equation $$\tau_{osc} = \lambda/2nv[1-\sin^2(\theta)/n^2]^{1/2} \quad (5)$$

If measurements are made of $\tau_{osc}$ for several different angles of incidence of the probe light, and the results compared with Eq. 5, then both n and v can be determined. For example, from Eq. 5 it follows that $$1/\tau_{osc}^2 = (4v^2n^2/\lambda^2) - (4v^2\sin^2(\theta)/\lambda^2) \quad (6)$$

Thus a plot of $(1/\tau_{osc}^2)$ as a function of $\sin^2(\theta)$ gives a linear plot with a slope of $(-4v^2/\lambda^2)$ and an intercept of $(4v^2 n^2/\lambda^2)$. Hence, from the determined values of the slope and the intercept, values of both the refractive index n and the sound velocity v can be determined. As can be appreciated, through the use of this method it is not necessary to make an independent measurement of n by ellipsometry. This method for measuring the velocity requires a variation in the direction of the probe light, and hence the embodiment of FIG. 1E is not applicable. C) The change $\Delta I_{probe-refl}(t)$ in the intensity of the reflected probe light is measured and the times $\tau_d$, $2\tau_d$, etc, at which the discontinuities in phase occur are determined. The refractive index n and the thickness d of the film F are determined by, for example, ellipsometry. The sound velocity v is then determined as $$v = d/\tau_d \quad (7)$$

It should be realized that the foregoing three methods for determining velocity and refractive index are not the only methods that can be used with the apparatus disclosed in FIGS. 1A–1E. Furthermore, various combinations of these three methods could be employed. By example, method C can be used to determine v. Then, from a measurement of the period $\tau_{osc}$ for a single angle of incidence of the probe, n can be determined. As such, the three methods disclosed above are not intended to be read in a limiting sense on the practice of this invention.

Once the sound velocity has been measured, such as by one of the preceding three methods, the determination of the stress in the film F proceeds as follows.

Let $v_0$ be the sound velocity in a bulk material, having the same composition as the material of the film F, in a stress free state. The sound velocity v in the film F is modified due to the presence of the stress in the film. For stresses in the range normally encountered in thin films the difference dv between the sound velocity v in the film and the velocity $v_0$ in the unstressed bulk material is proportional to the stress. The dependence of dv on the pressure P can be calculated in terms of the second and third order elastic constants of the material. If the film material in the absence of stress is isotropic (e.g., as in a glass), the change in the sound velocity dv is given by the expression $$dv/v_0 = [P(1-v)/C^2_{11}][vC_{111}-(1-v)C_{112}+4vC_{11}]/[(1+v)(1-2v)] \quad (8)$$

where v is Poisson's ratio, the in-plane stress is expressed in terms of the in-plane pressure P, $C_{111}$ and $C_{112}$ are third-order elastic constants, and $C_{11}$ is a second order elastic constant. Thus, a measurement of dv can be used to determine the in-plane stress as specified by P. The magnitudes of P that are of most interest to this invention typically lie in the range between $5 \times 10^8$ and $5 \times 10^9$ dynes/cm$^2$; these values cause a fractional change in sound velocity of the order of $10^{-3}$ which is readily measurable with the methods described above. The second and third order elastic constants are known for many materials, and the measurement of these constants can be accomplished by a number of established methods. It is also possible to measure the particular combination of these coefficients that is of interest, namely $[vC_{111}-(1-v)C_{112}+4vC_{11}]$ by the following procedure:

1) measure the sound velocity using one or more of the methods described above for a film deposited on a wafer, 2) apply forces to the wafer so that it has a spherical curvature with radius R, 3) calculate the stress that this curvature induces in the film F, 4) measure the amount by which the sound velocity has changed, and 5) use Eq. 8 with the known values of P and dv to determine the combination $[vC_{111}-(1-v)C_{112}+4vC_{11}]$.

Different preparation methods can lead to films whose mass density $\rho$ is different from the density of the unstressed bulk material. Consider, for example, a reference bulk sample of some material, such as amorphous silicon. Suppose that this reference sample has a density $\rho_0$, a sound velocity $v_0$, and a refractive index $n_0$. Now consider a film of amorphous silicon which is under a stress described by the pressure P, and further suppose that if the film were removed from the sample, so that it was in a stress free state, its density would be $\rho$. Define the density difference $d\rho = \rho - \rho_0$. This density difference between the film and the bulk reference sample arises because the methods used to prepare the reference sample and the film are different. For such a film the sound velocity v and the refractive index of the film n (when it is on the substrate and stressed) differ from the sound velocity and refractive index of the reference material, not only because of the stress, but also because of the density difference. Thus we have $$dv/v_0 = a_1 d\rho + a_2 P \quad (9)$$

where:

$d\rho$ indicates the difference between the mass density that the film would have if it were allowed to relax to a stress free state (for example, the density it would have if it were removed from contact with the substrate), and the mass density $\rho_0$ of bulk material in the unstressed state;

$a_1$ is a coefficient of proportionality between the change in sound velocity and the change in density; and $a_2$ is a coefficient of proportionality between the change in sound velocity and the stress in the film.

From Eq. 8 the coefficient $a_2$ is given by $$[(1-v)/C^2_{11}][vC_{111}-(1-v)C_{112}+4vC_{11}]/[(1+v)(1-2v)]. \quad (10)$$

Under these situations a measurement of $dv/v_0$ cannot be used to find the stress P because of the presence of the term $a_1 d\rho$ in Eq. 9. Thus, it would be incorrect to assume that $$P = (dv/v_0)/a_2. \quad (11)$$

However, in this circumstance it is still possible to proceed to determine the stress by means of the following method.

If the mass density $\rho$ of the film F is modified from the normal value as a result of the method by which the film was prepared, this will also affect the refractive index n of the film. Let $n_0$ be the refractive index for the bulk material having the same composition as the material of the film and in a stress-free state. The small difference dn between n and $n_0$ is dependent on the density difference $d\rho$ and the stress P, $$dn/n_0 = a_3 d\rho + a_4 P, \quad (12)$$

where $a_3$ and $a_4$ are coefficients of proportionality. For a material system in which the coefficients $a_1$, $a_2$, $a_3$, and $a_4$ are known beforehand, measurement of the two quantities $dv/v_0$, and $dn/n_0$. then makes it possible to determine a definite value for the stress P.

For some films there may be a parameter ξ other than the density which significantly affects the sound velocity and the refractive index. Examples of such parameters include, but are not limited to, 1) the concentration of one chemical component in the film, and 2) the degree of crystallinity of the film. In this case it is possible to proceed by a method identical to that just described but with the parameter ξ replacing the density at all points in the calculation.

The use of this invention also makes it possible to measure stress distributions in the film F. The pump light pulse P1 that is used to generate the strain pulse S1, and the probe light pulse P2 which is used to detect the propagating strain pulse are directed to the region of the film in which it is desired to measure the stress. The spatial resolution of the measurement is determined by the area illuminated by the pump and probe beams. This can be as small as, by example, 0.1 micron or as large as, by example, 100 micron.

The foregoing method has been described as being applied to a single transparent film F deposited on a substrate. It is assumed that the optical absorption of the pump light pulse P1 in the material of the substrate is large enough that the strain pulse S1 is generated with sufficient amplitude for detection by the probe pulse P2. However, the method of this invention can be applied to a much broader class of samples. These include, but are not limited to, the following.

1) A transparent film F that is deposited onto a second film G which lies between film F and the substrate. The pump light P1 can be absorbed in either the film G, or in the substrate, or partially in the film G and partially in the substrate. A strain pulse originates from either or both regions in which the pump light is absorbed.

2) A semi-transparent film F that is deposited onto a substrate. If the film F has a finite absorption of the probe pulse P2 the amplitude of the oscillations in the change $\Delta I_{probe-refl}(t)$ in the intensity of the reflected probe light will not have a constant amplitude. However, provided the absorption is not too large the period of the oscillations $\tau_{osc}$ and the time $\tau_d$ can still be determined and the foregoing method applied as described above.

3) A transparent film F that is deposited onto the substrate, and that has a second transparent film G deposited on top of it. For such a sample a part of the strain pulse S1 enters the film G at the time $\tau_d$, and part is reflected back into film F. For such a sample it is possible to determine the stress in both of the films F and G.

4) A transparent film F that is deposited onto the substrate, and that has a second film G, which is partially absorbing, deposited on top of film F. For such a sample part of the light of the pump pulse is absorbed in film G and part is absorbed in the substrate. Thus, there will be strain pulses generated both in film G and in the substrate, and probe light is reflected at both of these strain pulses.

5) A sample geometry of one of types 1)–4) above, but in which the film that absorbs the light is patterned. As an example, the film may be patterned as a series of strips. The pump and/or the probe beam can be directed to be incident on a single strip, or may illuminate a number of strips.

Figure 8:
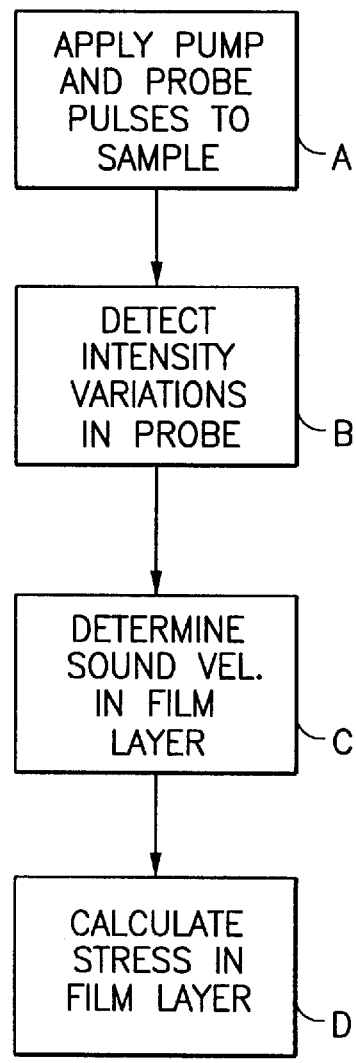
FIG. 8 is a logic flow diagram that illustrates a method in accordance with this invention.

Based on the foregoing description it should be clear that this invention teaches a method for measuring stress in a film layer disposed over a substrate. Referring to FIG. 8, the method includes steps of (A) applying a sequence of optical pump pulses to the film layer, individual ones of said optical pump pulses inducing a propagating strain pulse in the film layer, and for each of the optical pump pulses, applying at least one optical probe pulse, the optical probe pulses being applied with different time delays after the application of the corresponding optical probe pulses, (B) detecting variations in an intensity of a reflection of portions of the optical probe pulses, the variations being due at least in part to the propagation of the strain pulse in the film layer; (C) determining, from the detected intensity variations, a sound velocity in the film layer; and (D) calculating, using the determined sound velocity, the amount of stress in the film layer.

As was indicated above, the signal processor 101 coupled to the various embodiments of the measurement systems shown in FIGS. 1A–1E is preferably used for executing the foregoing methods, and outputs a measurement of the stress in the film layer F.

The film thickness values that can be used with embodiments of this invention depend in part on which of the methods disclosed above are used for the determination of the sound velocity. For Method A above, the film should be sufficiently thick for oscillations in the reflectivity to be seen. In order for one complete oscillation in ΔR to occur before the strain pulse is reflected at the free surface of the film the thickness of the film should be at least one half of the wavelength of light inside the film. Strictly speaking, this is correct for probe light at normal incidence to the film; however the change for probe light at oblique incidence to the film is not significant. Thus, for a refractive index of 1.5 and a light wavelength of 750 nm, the film thickness required for one complete oscillation is 0.25 micron. In a thinner film ΔR contains only a fraction of one oscillation. One may still determine the period of the oscillation, but with reduced accuracy. The use of Method B would require the same considerations. In the Method C, however, only the transit time through the film is measured. However, and as in Methods A and B, the accuracy of the determination of the velocity is reduced as the film thickness decreases. In general, the teachings of this invention enable measurements with film thicknesses in the range of about 300 Angstroms to about 30 microns.

The wavelengths that can be used to practice this invention lie in the range of about 2000 Angstroms to about 5 microns. The wavelength of the pump light is such that it is strongly absorbed in the substrate, or film (such as the film G referred to above), in order to generate the strain pulse. The wavelength of the probe light should be such that the film in which the stress is to be measured is at least semi-transparent. For a film of a semiconductor material this implies that the probe light lie in the infrared range.

The teachings of this invention can be applied to a number of materials of current interest in the semiconductor chip fabrication industry, including silicon dioxide, other glass films, polymers, crystalline or amorphous diamond films, silicon, germanium, and other semiconductors. It should be realized, however, that the teachings of this invention are not limited for use only in the semiconductor chip fabrication environment. In general, the teachings of this invention can be employed to advantage in many applications wherein it is desired to measure the stress in a thin film or layer.

Thus, while the invention has been particularly shown and described with respect to preferred embodiments thereof, it will be understood by those skilled in the art that changes in form and details may be made therein without departing from the scope and spirit of the invention.

What is claimed is:

1. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

operating a data processor for determining, from the detected variations in the transient optical response, a sound velocity v in the film layer, the data processor having an input coupled to an output of a detector of the variations in a transient optical response; and further operating the data processor for calculating, using the determined sound velocity, an amount of stress in the film layer.

2. A method as in claim 1, wherein the step of detecting measures a period of an oscillation in an intensity of a reflection of portions of the optical probe pulses.

3. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein the step of detecting comprises the steps of, measuring a period $\tau_{osc}$ of an oscillation in an intensity $\Delta I_{probe-refl}(t)$ of a reflection of portions of the optical probe pulses having a wavelength $\lambda$;

determining the refractive index n of the film layer;

determining an angle $\theta$ at which the optical probe pulses are incident onto the film layer;

calculating an angle $\alpha$, between the direction of propagation of the probe pulse in the film layer and a direction normal to the surface of the film layer, from the refractive index n in accordance with sin ($\alpha$) =sin ($\theta$)/n; and wherein the step of determining the sound velocity v is accomplished in accordance with the expression $$\tau_{osc}=\lambda/2nv \cos (\alpha).$$

4. A method for measuring stress in a film layer disposed over a substrate. comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein the step of detecting comprises the steps of, measuring, at a series of incident angles $\theta$, a period $\tau_{osc}$ of an oscillation in an intensity $\Delta I_{probe-refl}(t)$ of a reflection of portions of the optical probe pulses having a wavelength $\lambda$, wherein a dependence of $\tau_{osc}$ on the angle $\theta$ is given by $$\tau_{osc}=\lambda/2nv[1-\sin^2(\theta)/n^2]^{1/2};$$

determining a reciprocal of a delay $(1/\tau^2)$ and plotting $(1/\tau^2)$ as a function of $\sin^2(\theta)$ to yield a linear plot with a slope of $(-4v^2/\lambda^2)$ and an intercept of $(4v^2 n^2/\lambda^2)$; and from the determined values of the slope and the intercept, determining values of both the refractive index n and the sound velocity v of the film layer.

5. A method as in claim 1, wherein the step of detecting measures a change in intensity of a reflection of portions of the optical probe pulses and determines a time at which the propagating strain pulse reflects from a boundary of the film layer.

6. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein the step of detecting comprises the steps of, measuring a change $\Delta I_{probe-refl}(t)$ in an intensity of a reflection of portions of the optical probe pulses; determining times $\tau_d$, $2\tau_d$, . . . , at which times discontinuities in the phase of an oscillation in the intensity $\Delta I_{probe-refl}(t)$ occur;

determining the refractive index n and the thickness d of the film layer; and wherein the step of determining the sound velocity v is accomplished in accordance with the expression $v=d/\tau_d$.

7. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein the step of calculating the amount of stress in the film layer is comprised of the steps of, calculating a difference between the determined sound velocity v and the sound velocity $v_0$ in a bulk material in an unstressed state that has the same composition as the material of the film layer; and determining an in-plane stress in the film layer in accordance with the expression $$dv/v_0 = [P(1-v)/C^2_{11}][vC_{111}-(1-v)C_{112}+4vC_{11}]/[(1+v)(1-2v)],$$

where v is Poisson's ratio, an in-plane stress is expressed in terms of an in-plane pressure P, $C_{111}$ and $C_{112}$ are third-order elastic constants, and $C_{11}$ is a second order elastic constant.

8. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagration of the strain pulse in the film layer;

determining, from the detected variations, a sound velocity v in the film layer; and calculating, using the determined sound velocity, an amount of stress in the film layer, wherein for a case where a mass density p of the film layer is modified from a normal value as a result of a method by which the film layer was prepared, the step of calculating the amount of stress in the film layer is comprised of the steps of, determining a value for $dn/n_0$, where $n_0$ is the refractive index of a bulk material in an unstressed state that has the same composition as the material of the film layer; and using the equations $$dv/v_0 = a_1 d\rho + a_2 P, \text{ and}$$

$$dn/n_0 = a_3 d\rho + a_4 P$$

determines dρ and P, where $a_1$, $a_2$, $a_3$ and $a_4$ are coefficients of proportionality determined by other measurements on the material system.

9. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein for a case where a parameter ξ of the film layer, which affects the sound velocity and the refractive index, is modified from a normal value as a result of a method by which the film layer was prepared, the step of calculating the amount of stress in the film layer is comprised of the steps of, determining a value for $dn/n_0$, where $n_0$ is the refractive index of a bulk material in an unstressed state that has the same composition as the material of the film layer; and using the equations $$dv/v_0 = a_1 \xi + a_2 P, \text{ and}$$

$$dn/n_0 = a_3 \xi + a_4 P$$

determines ξ and P, where $a_1$, $a_2$, $a_3$ and $a_4$ are coefficients of proportionality determined by other measurements on the material system.

10. A method as in claim 1, wherein the film layer is one of a transparent or a semi-transparent film layer disposed on a surface of the substrate.

11. A method as in claim 1, wherein the film layer is a transparent film layer disposed on second film layer that is disposed between the film layer and the surface of the substrate.

12. A method as in claim 1, wherein the film layer is a transparent film layer disposed on the surface of the substrate, and which underlies one of a transparent or a semi-transparent second film layer.

13. A method as in claim 1, wherein the film layer is a patterned film layer.

14. A method for measuring stress in a film layer disposed over a substrate, comprising the steps of:

providing a sample comprised of a substrate and at least one film layer disposed over the substrate;

applying a sequence of optical pump pulses to the film layer, individual ones of said optical pump pulses inducing a propagating strain pulse in the film layer;

for each of the optical pump pulses, applying at least one optical probe pulse, the optical probe pulses being applied with different time delays after the application of the corresponding optical pump pulses;

detecting variations in a transient optical response of the sample to the optical probe pulses, the variations being due at least in part to the propagation of the strain pulse in the film layer;

determining, from the detected variations, a sound velocity v in the film layer; and calculating, using the determined sound velocity, an amount of stress in the film layer, wherein individual ones of the sequence of pump pulses are divided into multiple components, wherein each of said components is applied at a different angle to a surface of the film layer for generating a periodically varying grating, and wherein the step of detecting includes a step of detecting a portion of probe pulses that are diffracted due to a presence of the grating.

15. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer.

16. Apparatus as in claim 15, wherein said processor measures a period of an oscillation in intensity of a reflection of portions of the optical probe pulses.

17. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein said processor measures a period $\tau_{osc}$ of an oscillation in intensity $\Delta I_{probe-refl}(t)$ of a reflection of portions of the optical probe pulses having a wavelength $\lambda$; determines the refractive index n of the film layer; determines an angle $\theta$ at which the optical probe pulses are incident onto the film layer; calculates an angle $\alpha$, between the direction of propagation of the probe pulse in the film layer and a direction normal to the surface of the film layer, from the refractive index n in accordance with sin $(\alpha)$=sin $(\theta)$/n; and determines the sound velocity v in accordance with the expression $\tau_{osc}$=$\lambda$2nv cos $(\alpha)$.

18. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein said processor measures, at a series of incident angles $\theta$, a period $\tau_{osc}$ of an oscillation in intensity $\Delta I_{probe-refl}(t)$ of a reflection of portions of the optical probe pulses having a wavelength $\lambda$, wherein a dependence of $\tau_{osc}$ on the angle $\theta$ is given by $\tau_{osc}$=$\lambda$/ 2nv[1-sin$^2$ $(\theta)$/n$^2$]$^{1/2}$; determines a reciprocal of a delay $(1/\tau^2)$ and plots $(1/\tau^2)$ as a function of sin$^2(\theta)$ to yield a linear plot with a slope of $(-4v^2/\lambda^2)$ and an intercept of $(4v^2n^2/1^2)$; and determines, from the determined values of the slope and the intercept, values of both the refractive index n and the sound velocity v of the film layer.

19. Apparatus as in claim 15, wherein said processor measures a change in intensity of a reflection of portions of the optical probe pulses and determines a time at which the propagating strain pulse reflects from a boundary of the film layer.

20. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein said processor measures a change $\Delta I_{probe-refl}(t)$ in intensity of a reflection of portions of the optical probe pulses; determines times $\tau_d$, $2\tau d$, ..., at which times discontinuities in the phase of an oscillation in the intensity $\Delta I_{probe-refl}(t)$ occur; determines the refractive index n and the thickness d of the film layer; determines the sound velocity v in accordance with the expression v=d/$\tau_d$.

21. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein said processor calculates a difference between the determined sound velocity v and the sound velocity $v_0$ in a bulk material in an unstressed state that has the same composition as the material of the film layer;

and calculates an in-plane stress in the film layer in accordance with the expression $$dv/v_0 = [P(1-v)/C^2{}_{11}][vC_{111}-(1-v)C_{112}+4vC_{11}]/[(1+v)(1-2v)],$$

where v is Poisson's ratio, an in-plane stress is expressed in terms of an in-plane pressure P, $C_{111}$ and $C_{112}$ are third-order elastic constants, and $C_{11}$ is a second order elastic constant.

22. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein for a case where a mass density p of the film layer is modified from a normal value as a result of a method by which the film layer was prepared, the processor calculates the amount of stress in the film layer by determining a value for $dn/n_0$, where $n_0$ is the refractive index of a bulk material in an unstressed state that has the same composition as the material of the film layer; and using the equations $$dv/v_0 = a_1 d\rho + a_2 P, \text{ and}$$

$$dn/n_0 = a_3 d\rho + a_4 P$$

calculates $d\rho$ and P, where $a_1$, $a_2$, $a_3$ and $a_4$ are coefficients of proportionality determined by other measurements on the material system.

23. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein for a case where a parameter $\xi$ of the film layer, which affects the sound velocity and the refractive index, is modified from a normal value as a result of a method by which the film layer was prepared, said processor calculates the amount of stress in the film layer by determining a value for $dn/n_0$, where $n_0$ is the refractive index of a bulk material in an unstressed state that has the same composition as the material of the film layer; and using the equations $$dv/v_0 = a_1 \xi + a_2 P, \text{ and}$$

$$dn/n_0 = a_3 \xi + a_4 P$$

calculates $\xi$ and P, where $a_1$, $a_2$, $a_3$ and $a_4$ are coefficients of proportionality determined by other measurements on the material system.

24. Apparatus as in claim 15, wherein the film layer is one of a transparent or a semi-transparent film layer disposed on a surface of the substrate.

25. Apparatus as in claim 15, wherein the film layer is a transparent film layer disposed on second film layer that is disposed between the film layer and the surface of the substrate.

26. Apparatus as in claim 15, wherein the film layer is a transparent film layer disposed on the surface of the substrate, and which underlies one of a transparent or a semi-transparent second film layer.

27. Apparatus as in claim 15, wherein the film layer is a patterned film layer.

28. Apparatus as in claim 15, wherein said detector is responsive to at least one of a modulated change $\Delta R$ in an intensity of a reflected portion of the probe pulse, a change $\Delta T$ in an intensity of a transmitted portion of the probe pulse, a change $\Delta P$ in a polarization of the reflected probe pulse, a change $\Delta \phi$ in an optical phase of the reflected probe pulse, and a change in an angle of reflection $\Delta \beta$ of the probe pulse.

29. Apparatus for measuring stress in a film layer disposed over a substrate, comprising:

an optical source means for applying a sequence of optical pump pulses to the film layer, individual ones of said optical pump pulses inducing a propagating strain pulse in the film layer, said optical source means further applying, for each of the optical pump pulses, at least one optical probe pulse, the optical probe pulses being applied with different time delays after the application of the corresponding optical pump pulses;

an optical detector means for detecting variations in a transient optical response of the sample to the optical probe pulses, the variations being due at least in part to the propagation of the strain pulse in the film layer; and a data processor, coupled to said optical detector means, for determining, from the detected variations, a sound velocity in the film layer, and for calculating, using the determined sound velocity, an amount of stress in the film layer, wherein said optical source means is comprised of optical means for dividing individual ones of the sequence of pump pulses into multiple components, wherein each of said components is applied at a different angle to a surface of the film layer for generating a periodically varying grating, and wherein said detecting means detects a portion of probe pulses that are diffracted due to a presence of the grating.

* * * * *

UNITED STATES PATENT AND TRADEMARK OFFICE
CERTIFICATE OF CORRECTION

PATENT NO. : 5,864,393
DATED : Jan. 26, 1999
INVENTOR(S) : Maris

It is certified that error appears in the above-identified patent and that said Letters Patent is hereby corrected as shown below:

In column 21, line 24, after "to" insert an output of--;

In column 22, line 22, after "of" the formula "$(4v^2n^2/l^2)$" should appear as --$(4v^2 n^2/\lambda^2)$--;

In column 22, line 51, after "$\tau_d$," the formula "$2\tau d,...,$" should appear as --$2\tau_d,...,$-- ;

Signed and Sealed this

Fifteenth Day of June, 1999

Attest:

Attesting Officer

Q. TODD DICKINSON

Acting Commissioner of Patents and Trademarks